(12) United States Patent
Kwok et al.

(10) Patent No.: US 8,722,275 B2
(45) Date of Patent: May 13, 2014

(54) APPARATUS COMPRISING ASSEMBLY JIG AND METHOD FOR STACKING FUEL CELLS

(75) Inventors: Derek Kwok, Fremont, CA (US); Paul Knauer, Fremont, CA (US); Sergio Sanchez-Chopit, San Jose, CA (US)

(73) Assignee: Oorja Protonics Inc., Fremont, CA (US)

( * ) Notice: Subject to any disclaimer, the term of this patent is extended or adjusted under 35 U.S.C. 154(b) by 333 days.

(21) Appl. No.: 13/178,858

(22) Filed: Jul. 8, 2011

(65) Prior Publication Data
US 2012/0005885 A1    Jan. 12, 2012

Related U.S. Application Data

(60) Provisional application No. 61/363,167, filed on Jul. 9, 2010.

(51) Int. Cl.
*H01M 8/24* (2006.01)
*H01M 8/02* (2006.01)

(52) U.S. Cl.
USPC .............. 429/467; 429/511; 429/507; 29/760

(58) Field of Classification Search
USPC ................. 429/469, 510, 435, 467, 507, 511; 29/623.1, 623, 2, 760, 890.047, 281.1; 144/144.51; 414/426; 73/817; 164/109
See application file for complete search history.

(56) References Cited

U.S. PATENT DOCUMENTS

| | | | | |
|---|---|---|---|---|
| 2,645,935 | A | * | 7/1953 | Pramuk et al. ................... 73/817 |
| 3,451,853 | A | * | 6/1969 | Dieter ........................... 429/469 |
| 3,807,017 | A | * | 4/1974 | Une et al. ...................... 29/281.1 |
| 4,380,854 | A | * | 4/1983 | Jonason .................... 29/890.047 |
| 6,291,568 | B1 | * | 9/2001 | Lussey ........................... 524/413 |
| 2002/0150453 | A1 | * | 10/2002 | Hedley et al. ................. 414/426 |
| 2002/0182479 | A1 | * | 12/2002 | Mallari et al. ................... 429/44 |
| 2003/0031914 | A1 | * | 2/2003 | Frank et al. ...................... 429/35 |
| 2006/0283524 | A1 | * | 12/2006 | McDaniel et al. ........ 144/144.51 |
| 2009/0084676 | A1 | * | 4/2009 | Shin et al. ................ 204/298.09 |

* cited by examiner

*Primary Examiner* — Kenneth Douyette
(74) *Attorney, Agent, or Firm* — Rahman LLC

(57) ABSTRACT

An apparatus for fuel cell stacking includes an assembly jig having a base; an alignment assembly configured to be engaged with the base; and a compression assembly configured to be engaged with the alignment assembly.

8 Claims, 16 Drawing Sheets

APPARATUS COMPRISING ASSEMBLY JIG AND METHOD FOR STACKING FUEL CELLS

CROSS REFERENCE TO RELATED APPLICATION

This application claims priority from U.S. Provisional Application No. 61/363,167, filed on Jul. 9, 2010, the complete disclosure of which is incorporated fully herein by reference.

TECHNICAL FIELD

The embodiments herein relate to a fuel cell and, more particularly to an apparatus and a method for fuel cell stacking.

BACKGROUND

A fuel cell, like an ordinary battery, provides direct current electricity from two electrochemical reactions. These reactions occur at electrodes to which reactants are fed. For example, in a direct methanol fuel cell (DMFC), a negative electrode (i.e., anode) is maintained by supplying a fuel such as methanol, whereas a positive electrode (i.e., cathode) is maintained by supplying oxygen or air. When providing a current, methanol is electrochemically oxidized at an anode electro-catalyst to produce electrons, which travel through an external circuit to a cathode electro-catalyst where they are consumed together with oxygen in a reduction reaction. A circuit is maintained within the DMFC by the conduction of protons in an electrolyte.

A fuel cell stack typically includes a series of individual fuel cells. Each cell includes a pair of anode and cathode. A voltage across each cell is determined by the type of electrochemical reaction occurring in the cell. For example, for a typical DMFC single cell, the voltage can vary from 0 V to 0.9 V, depending on a current being generated. The current being generated in the cell depends on the operating condition and design of the cell, such as electrocatalyst composition/distribution and active surface area of a membrane electrode assembly (MEA), characteristics of a gas diffusion layer (GDL), flow field design of an anode and cathode bi-polar plates, cell temperature, reactant concentration, reactant flow and pressure distribution, reaction by-product removal, and so forth. The reaction area of a cell, number of cells in series, and the type of electrochemical reaction in the fuel cell stack determine a current and hence a power supplied by the fuel cell stack. For example, typical power for a DMFC stack can range from a few watts to several kilowatts. A fuel cell system typically integrates a fuel cell stack with different subsystems for the management of water, fuel, air, humidification, and thermal condition. These subsystems are sometimes collectively referred to as balance of the plant (BOP).

Precise alignment is an important aspect in a fuel cell stack assembly process. Any misalignment can lead to fluid or gas leaks that can impact performance or cause damage to a fuel cell stack. Many components that make up the fuel cell stack are assembled in series, which can increase the complexity of the assembly process. These components are typically positioned in one assembly and aligned to a single reference point within thousandths of an inch. This alignment was previously performed by pushing the components against a straight edge or sometimes by eye estimation, where accuracy and efficiency were difficult to achieve. As a result, it can sometimes take up to 8 to 10 hours to complete the assembly process. It is against this background that a need arose to develop the assembly jig and related methods described herein.

Therefore, there is a need for an apparatus and method for fuel cell stacking.

BRIEF DESCRIPTION OF THE FIGURES

The embodiments herein will be better understood from the following detailed description with reference to the drawings, in which.

DETAILED DESCRIPTION OF EMBODIMENTS

Figure 1A:
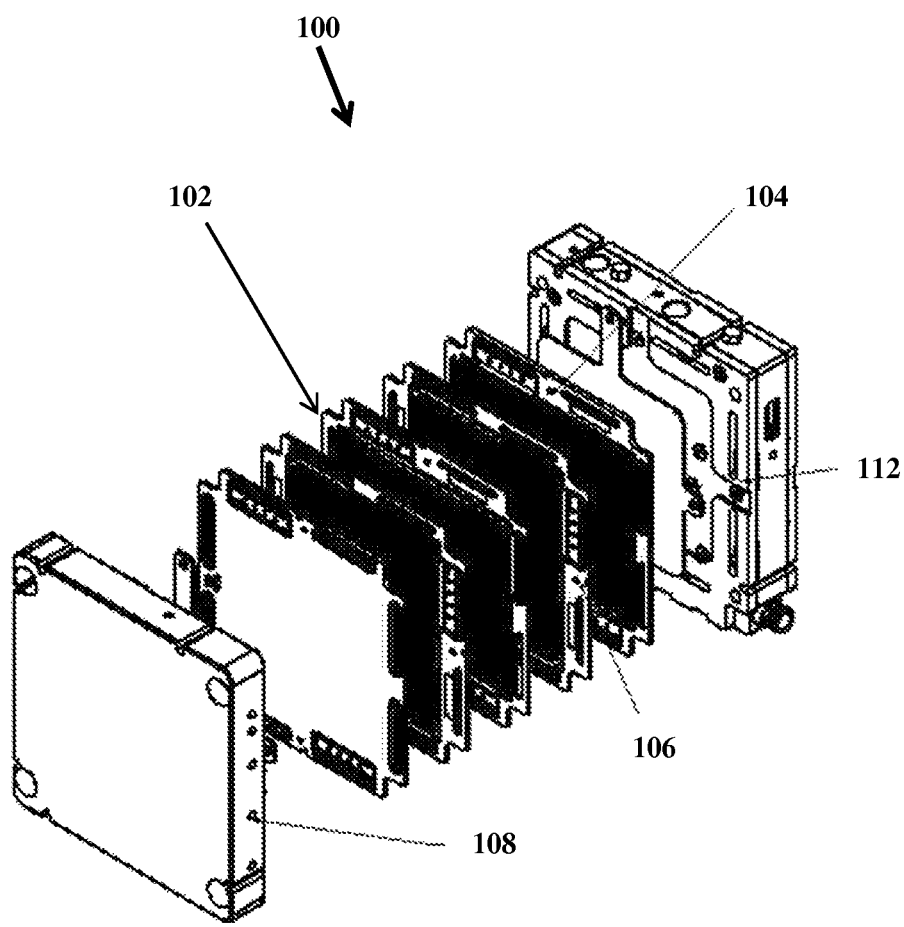
FIG. 1a and FIG. 1b depict an isometric view of a fuel cell stack according to the embodiments of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an apparatus and method that can be used for fuel cell stacking. Referring now to the drawings, and more particularly to FIG. 1a through FIG. 12 where similar reference characters denote corresponding features consistently throughout the figures there are shown preferred embodiments.

Figure 1B:
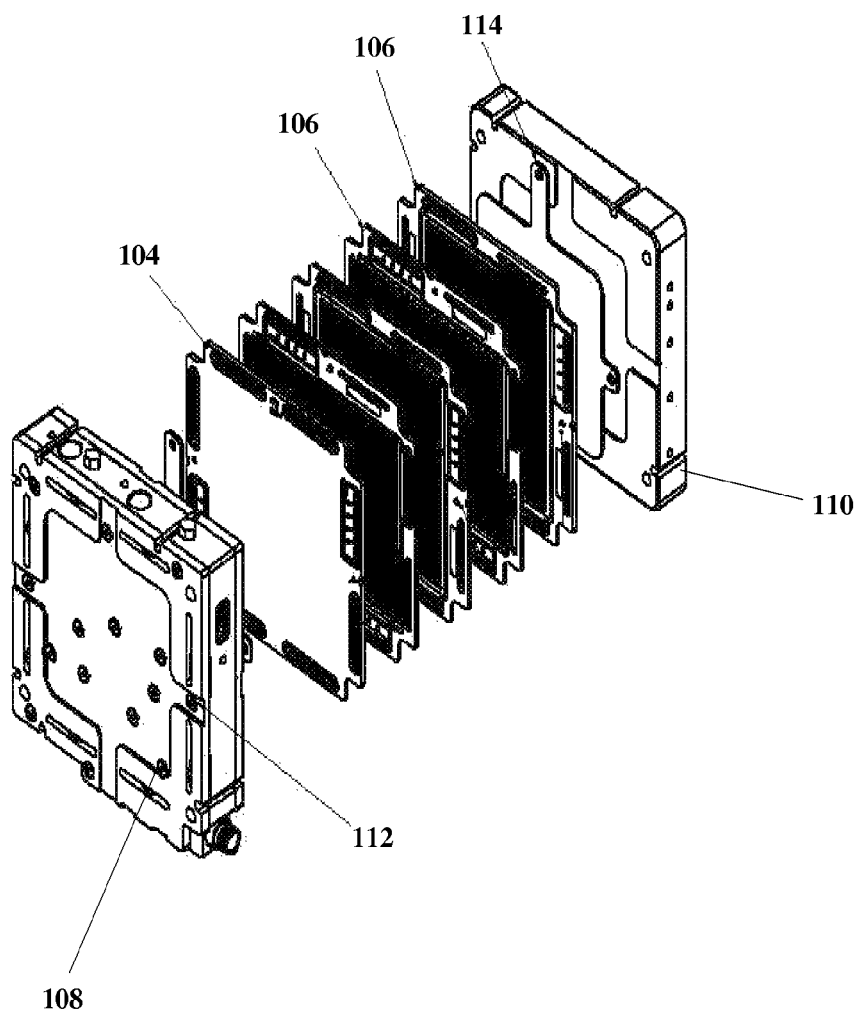

FIGS. 1a and 1b depict isometric views of a fuel cell stack 100 according to the embodiments of the present invention. The fuel cell stack 100 includes a plurality of fuel cells 102, a plurality of mono polar plates 104, a plurality of bi polar plates 106, a top end plate 108, a bottom end plate 110, a center manifold 112 and a plurality of current collector plates 114. The fuel cell 102 further includes a membrane electrode assembly (MEM) (not shown) that may be sandwiched between two gas diffusing layers (GDL) (not shown). The membrane electrode assembly includes an anode with anode catalyst coating provided between a first GDL and the MEA, and a cathode with cathode catalyst coating provided between a second GDL and the MEA. The MEA may further be sandwiched between two flow field plates, wherein the flow field plates may be a mono polar plate 104 or a bi polar plate 106. Further, the plurality of fuel cells 102 may be provided using the flow field plates and sandwiched between two end plates namely top end plate 108 and the bottom end plate 110 and one center manifold 112.

Figure 2:
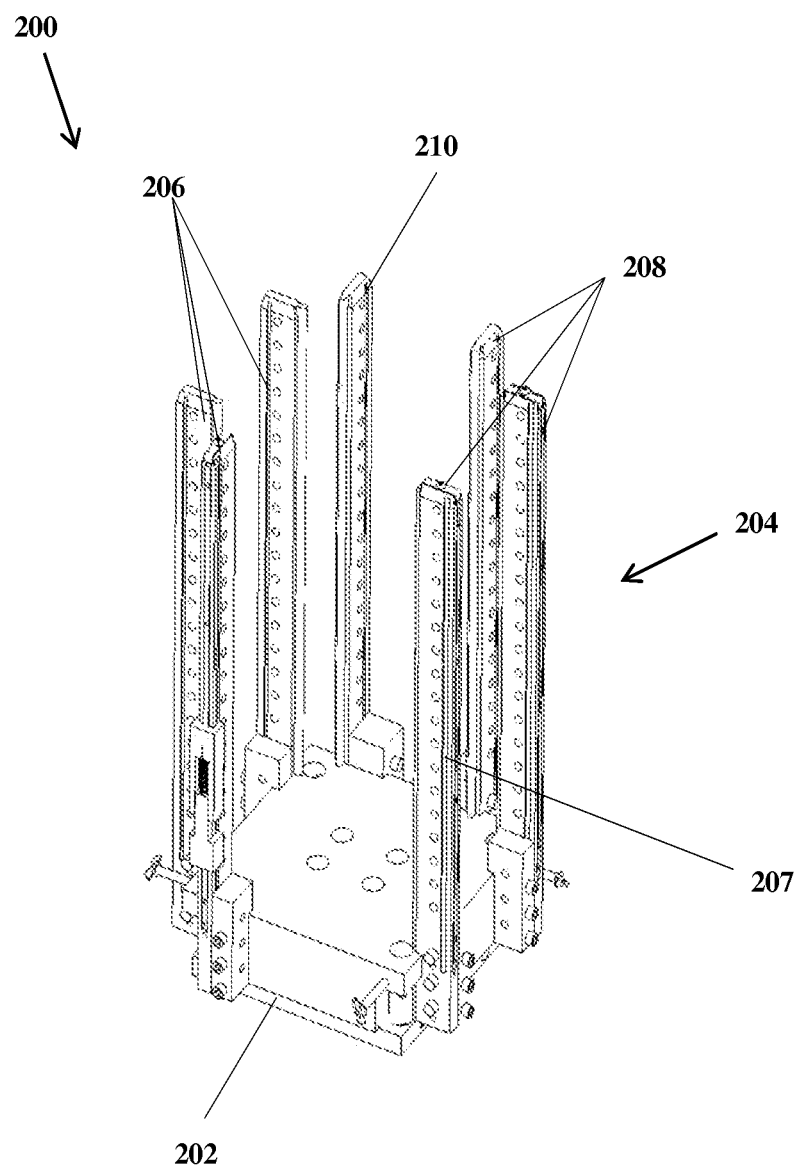
FIG. 2 depicts an isometric view of an assembly jig according to the embodiments of the present invention.

FIG. 2 depicts an isometric view of an assembly jig 200 according to the embodiments of the present invention. The assembly jig 200 may include a base 202 and an alignment assembly 204. The alignment assembly 204 defines a plane in which the fuel cells 102 are configured to be stacked. Further, the alignment assembly 204 includes a plurality of locating rods 206 for defining locating points and a plurality of push rods 208. In one embodiment, the push rods 208 may be sprung rods and serve to push the components of fuel cell stack 200 against the locating rods 206. The locating rods 206 and the push rods 208 extend transversely to the surface of the base 202 and are fastened to the base 202 via bolts or similar means Further, each of the locating rods 206 and push rods 208 may include a plurality of through holes 207 that are drilled out in an equally spaced manner.

Figure 2A:
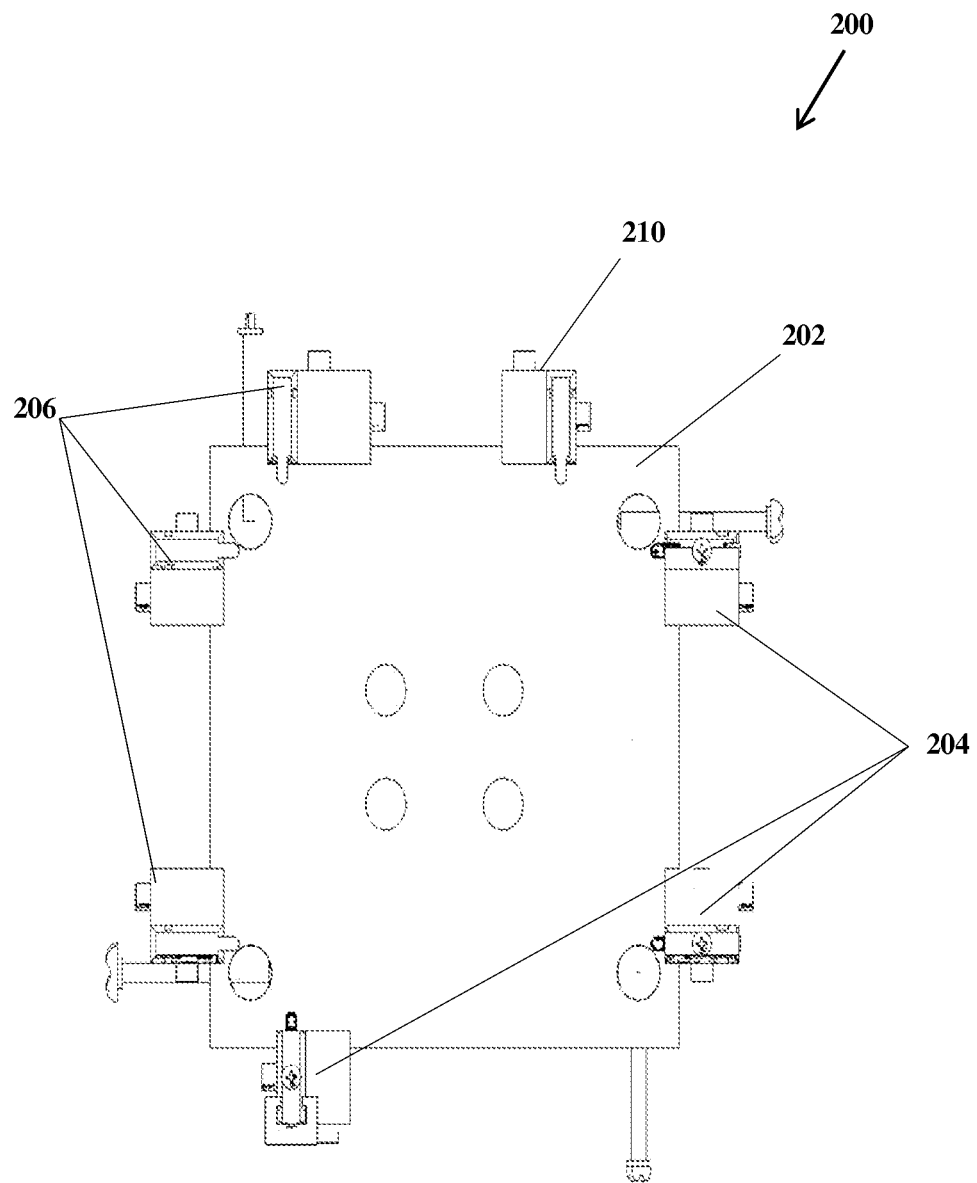
FIG. 2a depicts a top view of an assembly jig according to the embodiments of the present invention.

FIG. 2a depicts a sectional view of an assembly jig 200, illustrating the alignment assembly 204 according to the embodiments of the present invention. In an embodiment, the alignment assembly 204 is provided with three locating rods 206 and three push rods 208. However, it is also within the scope of the invention that the alignment assembly 204 may include any number of locating rods 206 and push rods 208 without otherwise deterring the intended function of the alignment assembly 204 as can be deduced from this description. Further, the alignment assembly 204 may be provided with an additional compression rod 210 which may serve as a structural member for stack compression. In another embodiment, the compression rod 210 may act as a sprung to push the fuel cell stack 100 against the three locating rods 206.

Figure 2B:
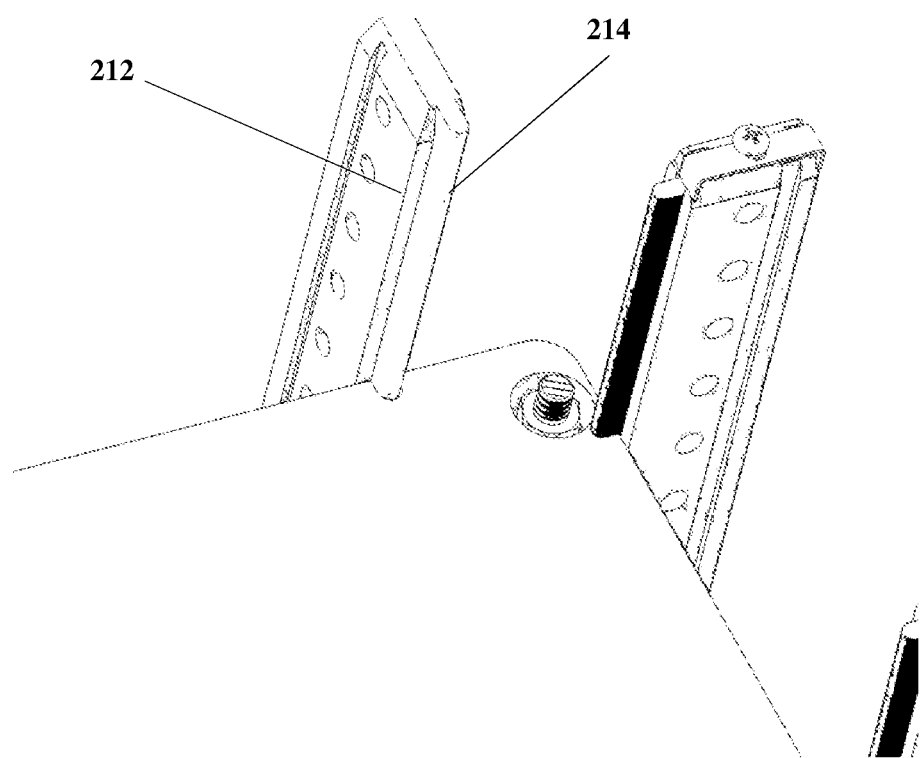
FIG. 2b depicts a sectional view of an assembly jig illustrating projections in the alignment assembly according to the embodiments of the present invention.

FIG. 2b depicts a sectional view of an assembly jig with projections in the alignment assembly 204 according to the embodiments of the present invention. A front surface 212 of each of the locating rods 206, the push rods 208 and the compression rod 210 may be provided with a projection 214 that extends in an axis parallel to the central axis of the base 202. Further, the components of the fuel cell stack 100 may be provided with notches 216. The projections 214 in the alignment assembly 204 may be adapted to engage with the notches 216 of the components of the fuel cell stack 100. Further, the projections 214 and the notches 216 facilitate to ensure that the components of the fuel cell stack 100 are assembled in a single orientation. Further, as the end plates 108 and the bi-polar plates 106 have different footprints, cut-outs are formed in the end plates, such that the projections of the alignment assembly 104 can engage the bi-polar plates 106.

Figure 3:
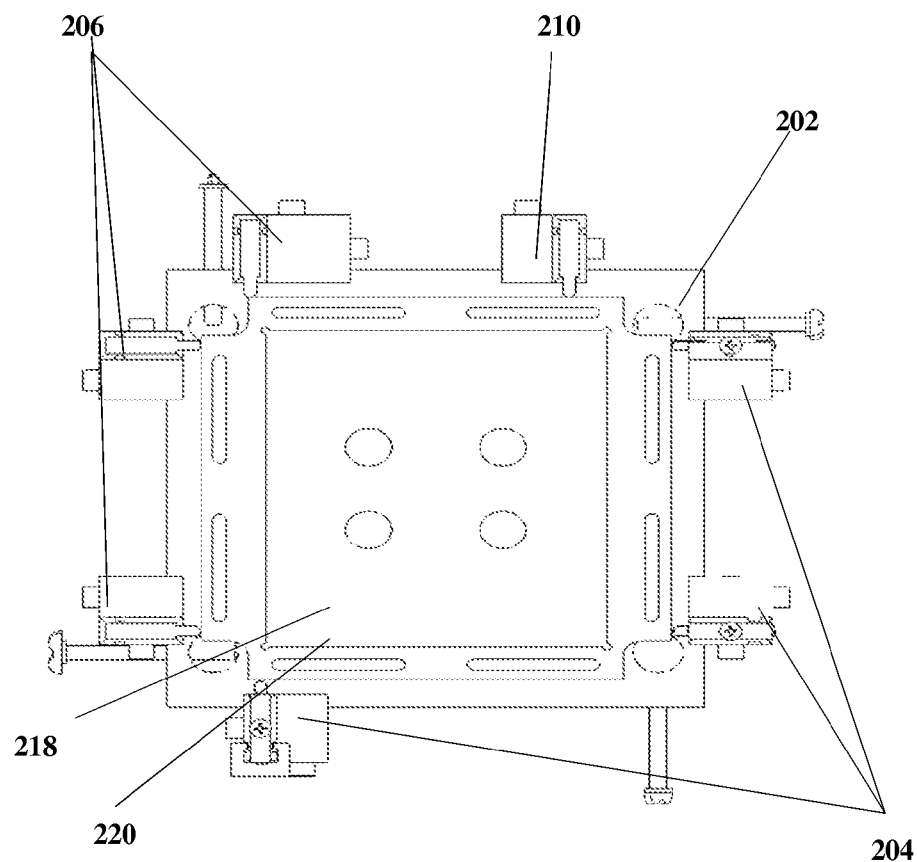
FIG. 3 depicts a top view of an assembly jig with a gas diffusion layer aligning tool according to the embodiments of the present invention.

FIG. 3 depicts a top view of an assembly jig with gas diffusion layer aligning tool according to the embodiments of the present invention. The MEA and the corresponding bi-polar plate 106 are typically rotated by 90 degree from one fuel cell to another fuel cell in the fuel cell stack 100. As a result, the outermost footprints of these components are desirably square shaped. However, the GDL has a rectangular footprint, and the GDL is typically rotated along with the MEA. Therefore, a square shaped GDL aligning tool 218 is desirable. The GDL aligning tool 218 may be provided with a rectangular internal cut out 220 and may be tightly fitted within the projections 214 of the aligning rods, such that the rectangular internal cut-out 220 remains centered with reference to the bi-polar plate 106 at any rotation. However, it is also within the scope of the invention that the internal cut out 220 in the GDL aligning tool 218 may be of different cross section without otherwise deterring the intended function of the GDL aligning tool 218 as can be deduced from this description.

Figure 4:
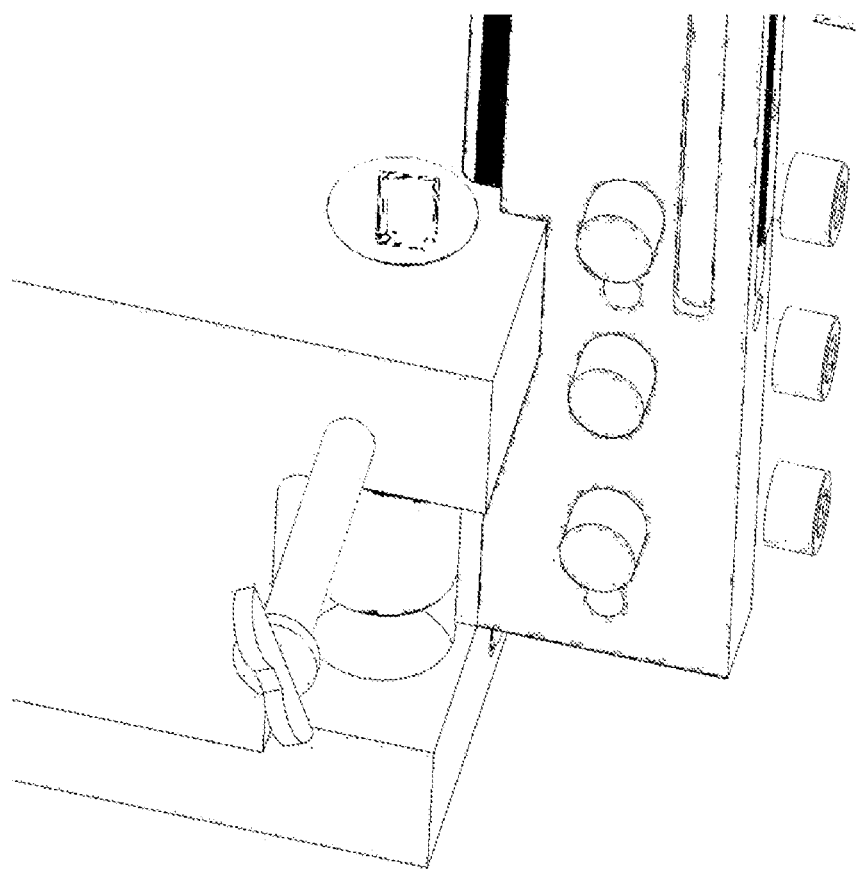
FIG. 4 depicts a sectional view of an assembly jig illustrating the sockets according to the embodiments of the present invention.

FIG. 4 depicts a sectional view of an assembly jig illustrating the sockets according to the embodiments of the present invention. In one embodiment, the base 202 of the assembly jig 20, upon which the fuel cell stack 100 rests includes a plurality of embedded sockets 220 that may be configured to lock the bottom end of tie rods (not shown). In one embodiment, the base 202 of the assembly jig 200 may include four embedded 13 mm sockets 220 to lock the bottom of the tie rods. However, it is also within the scope of the invention that the base 202 of the assembly jig 200 may include a plurality of sockets 220 which is of different length without otherwise deterring the intended function of the sockets 220 as can be deduced from this description.

Figure 5:
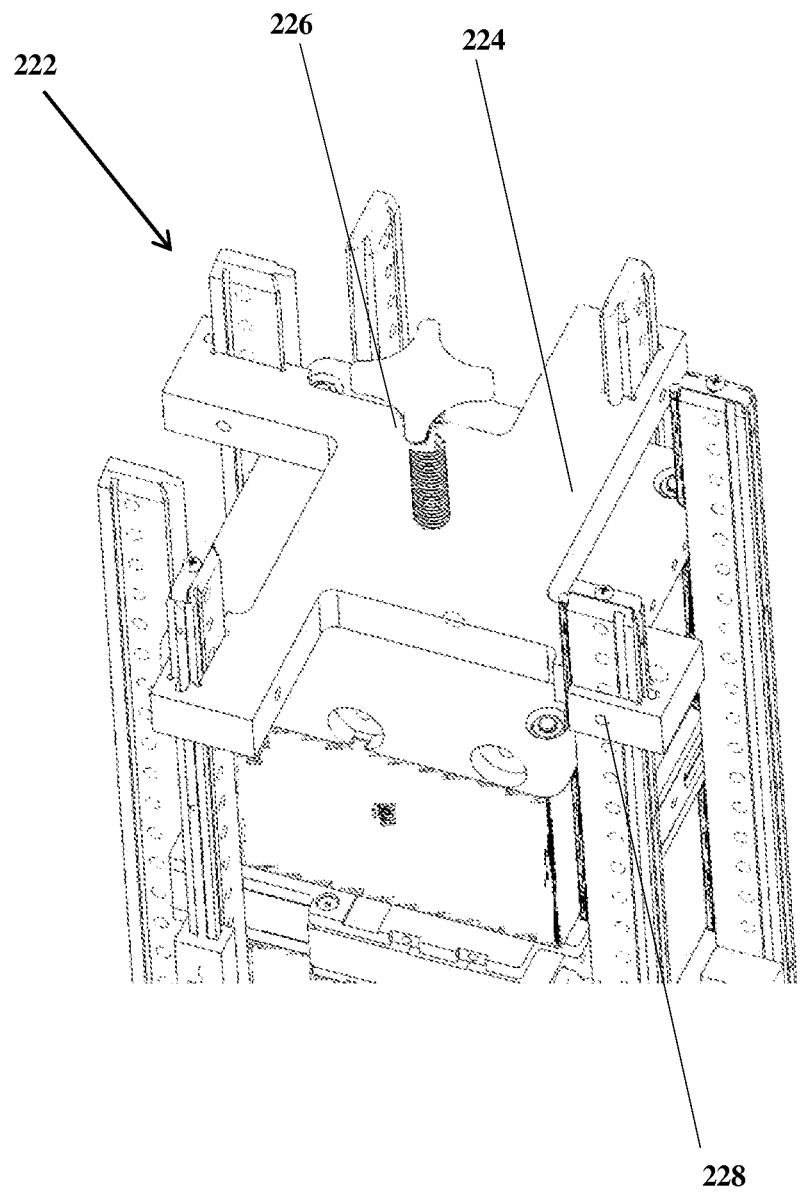
FIG. 5 depicts a top isometric view of an assembly jig with compression assembly according to the embodiments of the present invention.

FIG. 5 depicts a top isometric view of an assembly jig with compression assembly according to the embodiments of the present invention. In one embodiment, the assembly jig 200 includes a compression assembly 222 in order to facilitate compression of the fuel cell stack 100 without additional compression tools. The compression assembly 222 includes a top frame 224 and a knob 226. The top frame 224 is a flat rigid surface that is configured to slide with respect to the alignment assembly 204 and into the assembly jig 200. The sliding movement of the top frame 224 may be provided by means of a knob 226 and at least one through hole 228 that are provided at an outer surface of the flat rigid surface that is in contact with the alignment assembly 204. Further, a plurality of plungers (not shown) may be provided in order to lock and arrest a movement of the top frame 224. The plurality of plungers engages the through holes 228 in the top frame 224 with the through holes in the alignment assembly 204. Since the through holes in the alignment assembly 204 are closely spaced along the lengths of the alignment assembly 204, the top frame 224 can be applied to different stacks of various lengths. Further, the knob 226 may be provided on the top surface 230 of the top frame 224. The knob 226 may be a threaded knob, wherein the fuel cell stack 100 may be compressed by rotating the threaded knob in a clockwise direction and decompressed by rotating the threaded knob in an anti-clockwise direction. In one embodiment, the compression feature may be used to compress the fuel cell stack 200 to about 10,000 lb or more.

Figure 6:
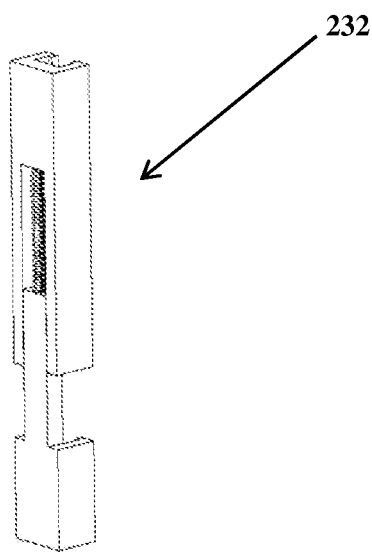
FIG. 6 depicts a front isometric view of a spacer according to the embodiments of the present invention.

FIG. 6 depicts a front isometric view of a spacer according to the embodiments of the present invention. In one embodiment, the alignment assembly 204 may include a plurality of spacers 232 in order to assemble or service a fuel cell stack 100 which do not have aligning notches. The spacers 232 may be configured to have an aligning surface that is maintained in contact with the bi-polar plates 106 of the fuel cell stack 100. In one embodiment, the aligning surface of the spacers 232 may be a substantially flat plane. Further, the spacers 232 are sprung along their length, wherein the length may be extended in the range of 4.0 to about 5.3 inches. Further, the spacers 232 may be configured to remain in their extended length during the compression of fuel cell stack 100. During assembly or service of the fuel cell stack 100, the spacers 232 may be slid up or down and locked in place along rails of a particular subset, or all, of the alignment assembly 204 to provide the proper spacing between the alignment assembly 204 and the fuel cell stack 100. In one embodiment, 14 spacers may be provided to perform the alignment process. However, it is also within the scope of the invention that any number of spacer 232 may be provided without otherwise deterring the intended function of the spacer 232 as can be deduced from this description.

Figure 7:
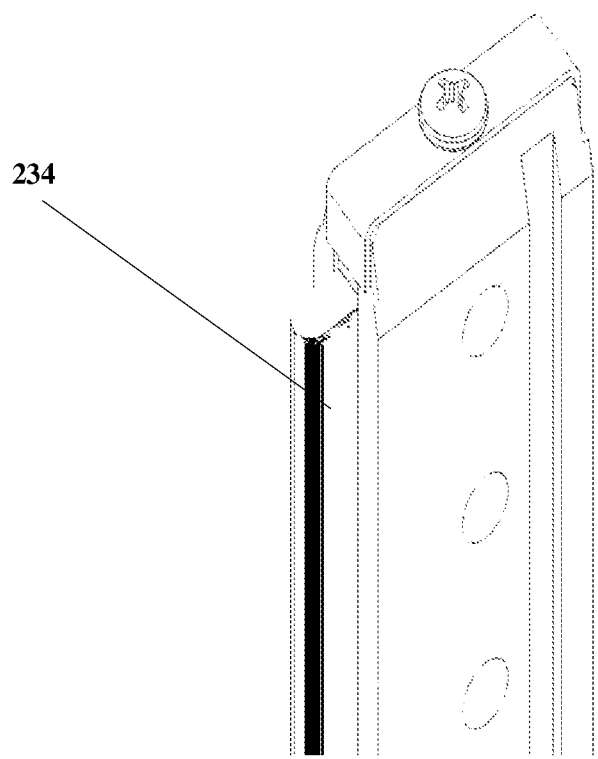
FIG. 7 and FIG. 7a depict a sectional view of alignment assembly according to the embodiments of the present invention.
Figure 7A:
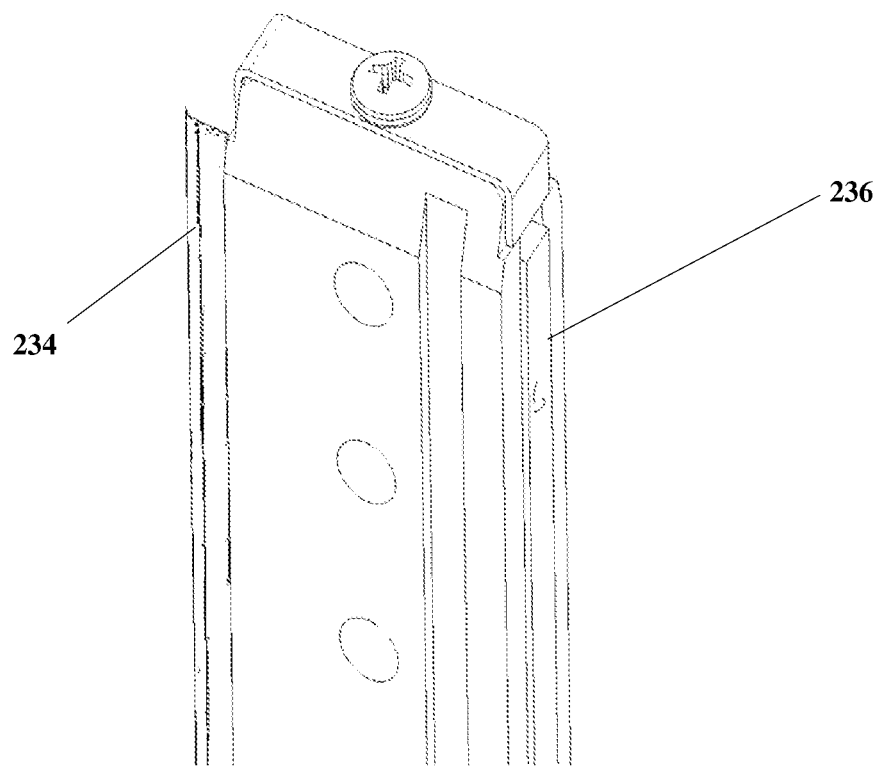
Figure 8:
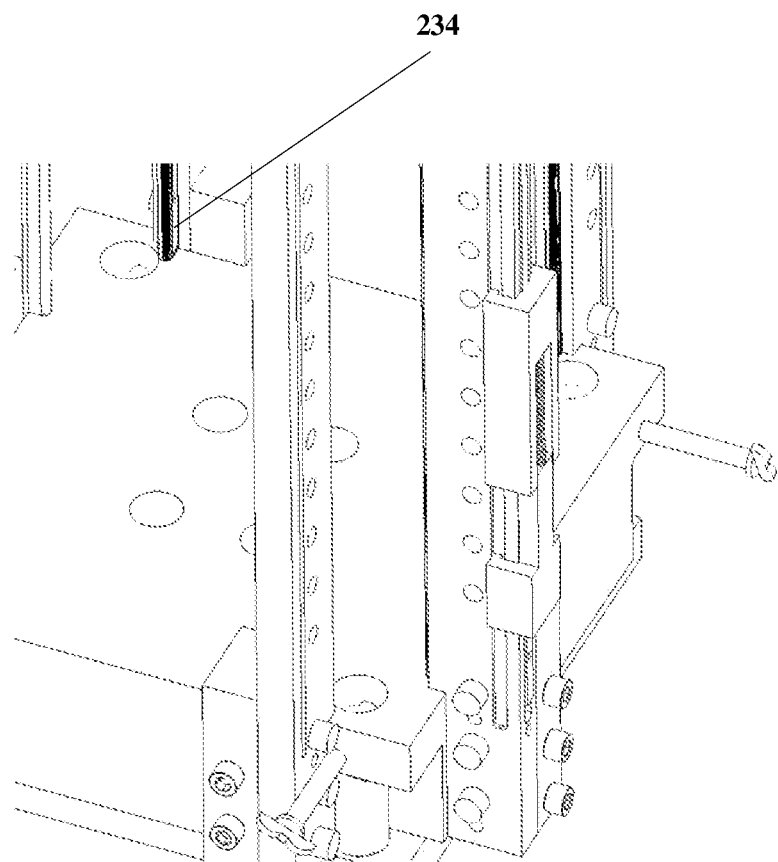
FIG. 8 depicts a sectional view of the assembly jig according to the embodiments of the present invention.

FIG. 7 and FIG. 7a depict a sectional view of aligning feature according to the embodiments of the present invention. In one embodiment, the push rods 208 of the alignment assembly 204 may be provided with a sprung projection 234 on the front side and a sprung back surface 236 on the back side. Therefore, each of the push rods 208 has a spring effect on two sides to facilitate alignment of fuel cell stacks 100 with aligning notches 216 as well as fuel cell stacks 100 which do not have aligning notches 216. In another embodiment, sprung projections 234 and sprung back surfaces 236 can also be formed on the locating rods 206. Further, when assembling or servicing a fuel cell stack 100 with aligning notches 216 on a center manifold 112 and end plates 108 and 110, spacers are not required, and alignment can be performed by having projections of the alignment assembly 204 facing and pushing against the fuel cell stack 100 as illustrated in FIG. 8.

Figure 9:
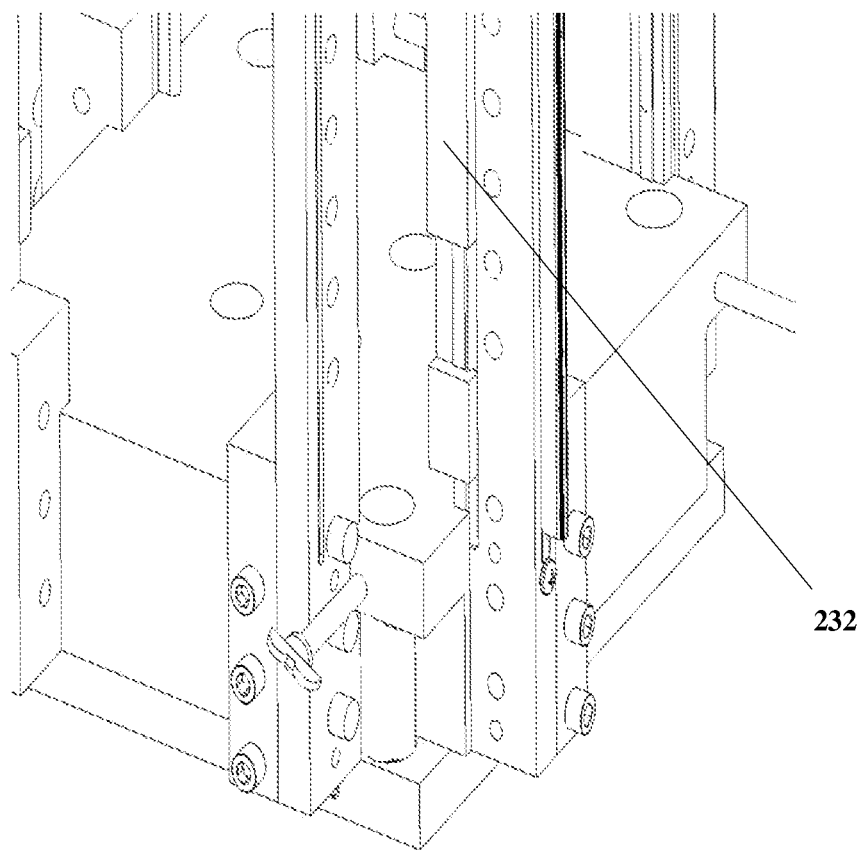
FIG. 9 depicts a sectional view of the assembly jig with spacer according to the embodiments of the present invention.

FIG. 9 depicts a sectional view of the assembly jig 200 with spacer according to the embodiments of the present invention. In another embodiment, if the fuel cells stack 100 do not have aligning notches 216, the back sides of the alignment assembly 204 face the fuel cell stack 100, and the spacers 232 are placed between the alignment assembly 204 and the fuel cell stack 100. Pushing forces from the push rods 208, including pushing forces from the back surfaces of the push rods 208, are transferred through the spacers 232 to the fuel cell stack 100, thereby pushing the fuel cell stack 100 against the locating rods 206. As a result, each newly added bi-polar plate 106 may be properly aligned and centered with respect to its desired location.

Figure 10:
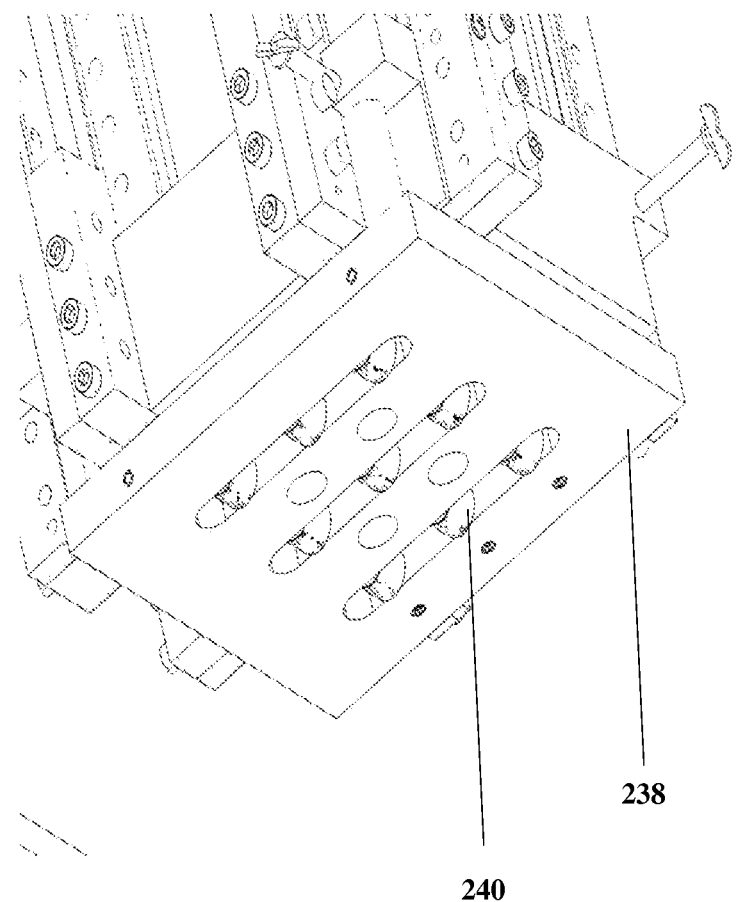
FIG. 10 depicts a sectional view of the assembly jig illustrating the rolling bearings according to the embodiments of the present invention.
Figure 11:
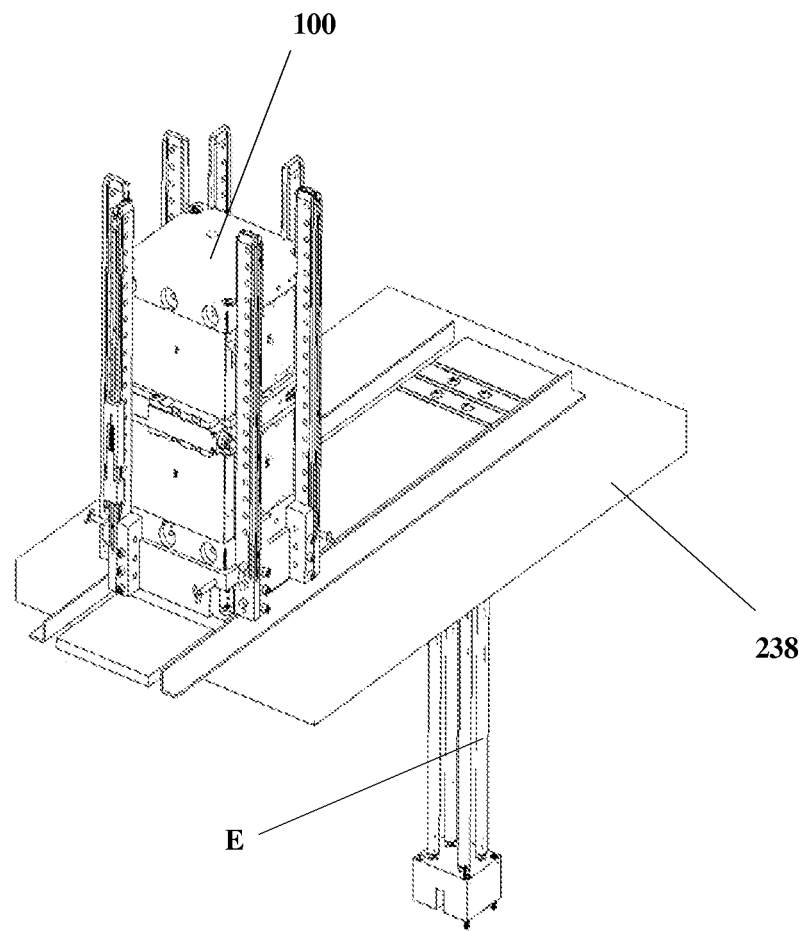
FIG. 11 depicts a top isometric view of the assembly jig with the hydraulic table top according to the embodiments of the present invention.

FIGS. 10 and 11 depict a sectional view of the assembly jig illustrating roller bearings, table top according to the embodiments of the present invention. In some cases, it is desirable to compress the fuel cell stack 100 with a compression force beyond what the assembly jig 200 can provide. Since the alignment of the fuel cell stack 100 is desirable throughout the assembly process, the fuel cell stack 100 is kept within the assembly jig 200 until the fuel cell stack 100 is fully compressed and fastened. To allow conveyance of the fuel cell stack 100, the assembly jig 200 is installed on a rolling table top 238 that may be hydraulically raised and lowered. However, it is also within the scope of the invention that the table top 238 may be raised or lowered by other similar kind of mechanisms without otherwise deterring the intended function of the table top 238 as can be deduced from this description. To facilitate sliding of the assembly jig 200 along the table top 238. Further, the assembly jig 200 may include plurality of roller bearing 240 that are provided at the bottom of the base 202 of the assembly jig 200. In one embodiment, the base 232 of the assembly jig 200 may be provided with nine roller bearings. More or less roller bearings 240 can be included, depending on the particular implementation. The rolling bearings 240 serve to reduce friction between the base of the assembly jig 200 and the hydraulic table top 238, and each of the rolling bearings 240 may be rated to withstand a load of about 1,550 lb or more. In such manner, the roller bearings 240 can withstand a compressive load while the fuel cell stack 100 is compressed up to about 10,000 lb or more. Therefore, an assembler can work on the fuel cell stack 100 at a desirable height according to physical characteristics of the assembler. Once the fuel cell stack 100 is ready for compression, the assembly jig 200 can be lowered to match the height of the external press. Advantageously, neither the fuel cell stack 100 nor the assembly jig 200 has to be manually lifted during conveyance from an assembly area to the external press. Also, the external press does not have to be modified, since the assembly jig 200 and the hydraulic table top 238 can be configured to match particular characteristics of the external press.

Figure 12:
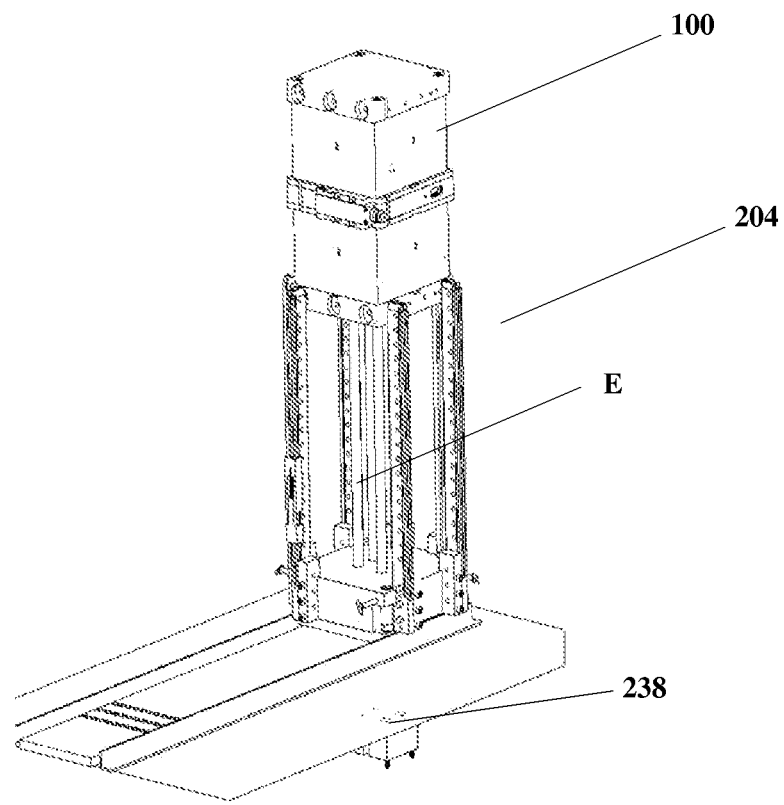
FIG. 12 depicts a top isometric view of the assembly jig with the ejection rods according to the embodiments of the present invention.

FIG. 12 depicts a top isometric view of the assembly jig 200 with the ejection rods E according to the embodiments of the present invention. After compression and fastening, the fuel cell stack 100 may be removed from the assembly jig 200 using a plurality of ejection rods E which are provided near the base 202 of the table top 238. The hydraulic table top 238 allows the fuel cell stack 100 to be ejected from the assembly jig 200 using ejection rods E which are movably coupled to a base of the table top. More or less number of ejections rods E can be included, depending on the particular implementation. To eject the fuel cell stack 100, the assembly jig 200 is positioned over the ejection rods E. As the table top is lowered, the ejection rods E pass through four corresponding holes formed in the base 202 of the table top and push against a bottom end plate of the fuel cell stack 100 thereby enabling the ejection of the fuel cell stack 100.

The method of stacking fuel cells 102 includes aligning the components of fuel cell stack 100 which include a plurality of fuel cells 102, mono polar plates 104, bi polar plates 106, top end plates 108, bottom end plates 110, center manifold 112 and current collector plates 114 by using alignment assembly 204, where the push rods 208 of the alignment assembly 204 push the components of the fuel cell stack 100 against the locating rod 206 for proper alignment. The assembly jig 200 further includes the GDL aligning tool 218 to align GDL having a smaller foot print than other components. Further, the assembly jig 200 includes sockets 220 to lock tie rods of the fuel cell stack 100. Once, the fuel cells 102 are aligned, the fuel cell components are compressed using a compression assembly 222 and ejected using the ejecting rods 240.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. An apparatus for fuel cell stacking, said apparatus comprising:
   an assembly jig comprising:
      a base;
      an alignment assembly configured to be engaged with said base; and
      a compression assembly configured to be engaged with said alignment assembly;
   a hydraulic table top; and
   a plurality of ejection rods,
   wherein each of said ejection rods is provided near said hydraulic table top.

2. The apparatus as claimed in claim 1, wherein each of said ejection rods is received inside said base.

3. The apparatus as claimed in claim 2, wherein said alignment assembly comprises:
   a plurality of locating rods; and
   a plurality of push rods, wherein each of said push rods are moveable relative to said base.

4. The apparatus as claimed in claim 3, wherein each of said ejection rods is configured to move in a direction parallel to a longitudinal axis of said push rods.

5. The apparatus as claimed in claim 4, wherein at least one of said locating rods and at least one of said push rods define a projection configured to be engaged with a notch provided in a fuel cell.

6. The apparatus as claimed in claim 4, wherein at least one of said locating rods and at least one of said push rods are configured to receive a spacer.

7. The apparatus as claimed in claim 1, wherein said compression assembly comprises:
   a top frame; and
   a knob that is in threaded arrangement with said top frame.

8. The apparatus as claimed in claim 7, wherein said top frame is slidable on said alignment assembly.

* * * * *